A. C. HULBERT.
ELECTRICALLY HEATED GLUE POT.
APPLICATION FILED APR. 17, 1912.

1,068,343.

Patented July 22, 1913.
2 SHEETS—SHEET 1.

WITNESSES
Frank A. Sinney
A. H. Kephart

INVENTOR
ANSEL C. HULBERT
BY Carlos P. Griffin
HIS ATTORNEY

A. C. HULBERT.
ELECTRICALLY HEATED GLUE POT.
APPLICATION FILED APR. 17, 1912.
1,068,343.
Patented July 22, 1913.
2 SHEETS—SHEET 2.
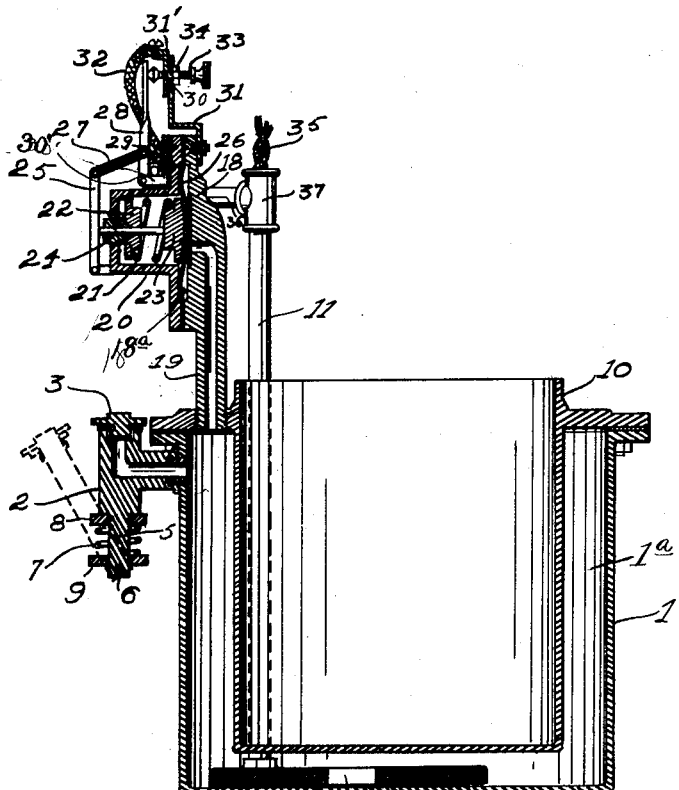
Fig. 3.
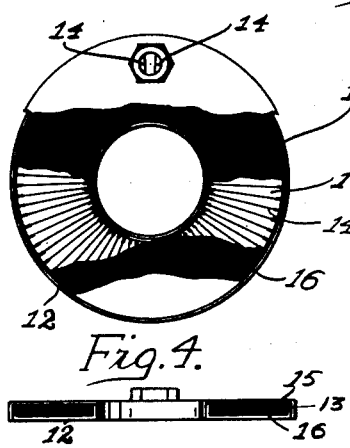
Fig. 4.
Fig. 5.
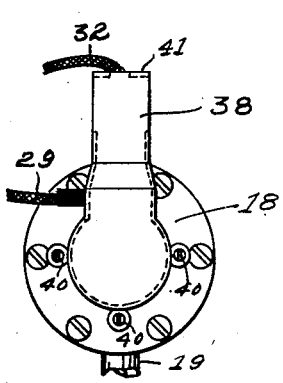
Fig. 6.
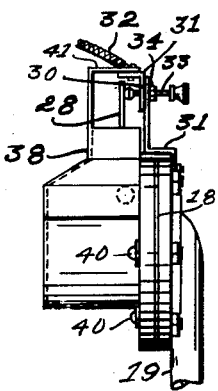
Fig. 7.
WITNESSES
A. H. Kephart
F. A. Sinney
INVENTOR
ANSEL C. HULBERT
BY Carlos P. Griffin
HIS ATTORNEY

UNITED STATES PATENT OFFICE.

ANSEL C. HULBERT, OF SAN FRANCISCO, CALIFORNIA.

ELECTRICALLY-HEATED GLUE-POT.

1,068,343.  Specification of Letters Patent.  Patented July 22, 1913.

Application filed April 17, 1912. Serial No. 691,270.

*To all whom it may concern:*

Be it known that I, ANSEL C. HULBERT, a citizen of the United States, residing at San Francisco, in the county of San Francisco and State of California, have invented a new and useful Electrically-Heated Glue-Pot, of which the following is a specification in such full and clear terms as will enable those skilled in the art to construct and use the same.

This invention relates to an electrically heated kettle and its object is to provide means for automatically maintaining the substance heated therein at a given temperature, without attention upon the part of the person using the same, by the use of a combined steam and electrical controlling apparatus.

An object of the invention is to provide a kettle which will not require the replenishing of the water used therein for a long period.

It will be understood that glue, chocolate, or any other substance may be heated in the apparatus.

Another object of the invention is to provide for the safety of the apparatus should it accidentally be heated too hot. A further object of the invention is to provide a heating unit which will act in the capacity of a heat storage body when the current is turned off.

Another object of the invention is to provide means for the regulation of the heat used in order that the temperature of the pot may be increased or decreased as may be necessary, and a further object is to prevent the loss of the water used to prevent the material heated from being burned.

Figure 1:
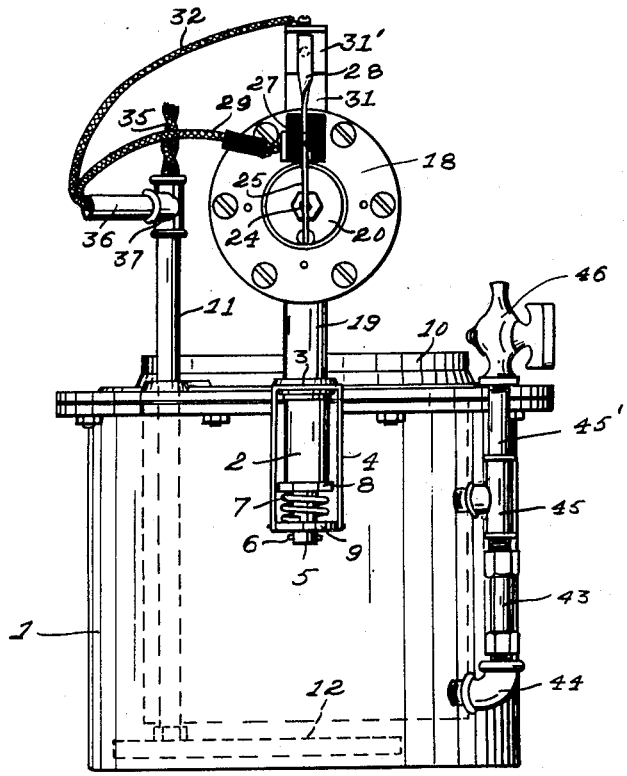
Figure 2:
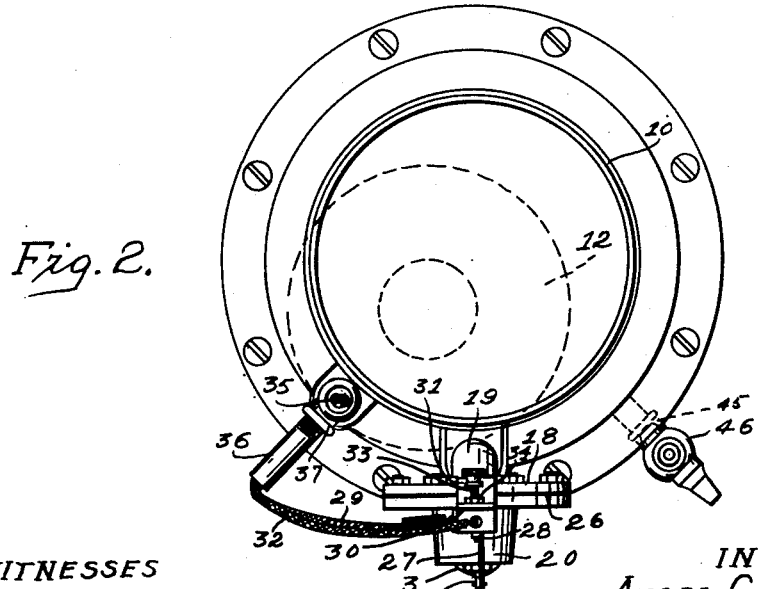

In the drawings in which the same numeral of reference is applied to the same portion throughout the several views, Figure 1 is a side elevation of the glue pot, Fig. 2 is a plan view thereof, Fig. 3 is a vertical sectional view through the pot, the safety device and the heat controlling apparatus, Fig. 4 is a plan view, partly broken away, of the heating element, Fig. 5 is a vertical sectional view of the heating element, Fig. 6 is an end view of the controlling apparatus showing the cover applied thereto for the protection of the regulating levers, and Fig. 7 is a side elevation of the heat controlling apparatus and cover therefor.

The numeral 1 represents an iron pot of suitable strength to withstand a pressure of about fifty pounds to the square inch. In the side of this pot there is provided a safety device 2. This safety device has a valve 3 held seated thereon by means of a stirrup 4, said stirrup being held on a downwardly projecting pin 5 extending from the safety device, by means of a cotter-pin 6. A spring 7 bears upon a washer 8 and upon the lower portion 9 of the stirrup 4 and holds the safety valve down. This safety device may be set to relieve any predetermined excessive pressure within the glue pot if the regulator is carelessly adjusted. The glue pot is flanged out at its upper edges and within the same it has an inner flanged vessel 10. This inner vessel is suitably bolted to the flanges of the pot 1 thereby forming a jacketed vessel having a sealed vapor-generating chamber 1$^a$, between the inner and outer walls thereof. A pipe 11 extends therethrough and to the bottom of the pot 1, at which point it is connected with the electrical heater 12. The electrical heater 12 comprises an asbestos or other heat resistant non-conductor 13. This non-conductor is annular in form and has notches cut in its edges for the reception of a resistance wire 14. This wire is wound around the annulus 13' and both ends of the same are brought out of the annulus at the pipe 11, suitable insulation being used to prevent a short circuit.

Above the resistance unit is a sheet of mica 15 and below the same is a small sheet of mica 16. The sheets of mica and heating unit are inclosed in a flat metallic box 12, which lies under the interior pot 10 and to which the tube 11 is connected.

The heat regulator comprises a casing 18 containing a recess 18$^a$ covered by a diaphragm 26 which is clamped between the periphery of the casing and a cap 20. The casing 18 is provided with a tubular extension 19 forming a standard which is screwed into the flange of the vessel 10. The compartment formed between the recess 18$^a$ and the diaphragm 26, is closed except for a communication with the vapor-generating chamber 1$^a$, formed by the bore of the tube 19.

A spring 21 bears upon flanged washers 22 and 23, the latter of which has a pin 24 connected therewith, said pin passing out of the cover 20 and bears against a lever 25. The spring pushes against the metallic diaphragm 26 with sufficient force to compress the spring a small amount, thus making it possible for a very light force to compress the spring more.

Inasmuch as the vapor-generating chamber is completely sealed and communicates with the compartment adjacent the diaphragm, which is yieldingly held under spring pressure, a very slight change in the fluid pressure in the chamber will actuate the diaphragm and the parts of the regulator may be set to operate upon any desired vapor tension and before any steam is generated.

The lever 25 is pivoted at its lower end to the cover 20 and its upper end is pivoted to a fiber link 27, which is in turn pivoted to a lever 28. This lever 28 has the electric wire 29 connected therewith and it is supported by a bracket 30' which is suitably insulated from the rest of the apparatus.

Secured to and extending above the regulator is a bracket 31. This bracket supports a screw 33 which is suitably insulated therefrom at 30 and which screw is secured in a given adjustment by means of the lock nut 34. The point of the screw 33 and the end of the lever 28 which coöperates therewith, constitute the contacts of the circuit-controller which controls the operation of the electric heater. Supported by the bracket 31 and screw 33 is a bracket 31' to which the wire 32 is connected, said bracket 31' also being insulated at 30 from the bracket 31. The electric wires 29 and 32 connect with the main lead wires 35 through a short piece of pipe 36 and a T 37 on the top of the pipe 11.

In order to prevent injury to the contact levers 25, 27 and 28, a metallic cover 38 is secured to the cover 20 by means of three screws 40, said cover having an L shaped portion 41 to pass over the top of the upper lever, while permitting it to be observed.

In order to observe the height of the water in the outer receptacle, a glass 43 is used. This glass is connected with an elbow 44 which is screwed into the pot 1, and at the top of the glass a T 45 is connected with the pot 1. Above the T 45 is a short pipe 45' which has a pet-cock 46 screwed thereon.

In operation the pot 1 is filled through the pipe 2 about one-third full of water. The electric current is turned on and the material to be heated is placed within the pot 10. As the temperature of the water rises in the pot 10, the pressure therein increases whereupon the diaphragm 26 will be pushed outwardly, thus disconnecting the lever 28 from the contact point of the screw 33 whereupon the temperature of the pot and its contents will begin to fall, but as the temperature falls the pressure therein falls and permits the lever 28 to again contact with the screw 33, whereupon the current will again be passed through the heater and will again cause it to rise in temperature. By the adjustment of the screw 33 it is possible to maintain the contents of the pot at a substantially uniform temperature.

The spring 7 is so set to hold a greater pressure than is ordinarily expected to be used in the heating of the materials within the pot, but this pressure is ordinarily not more than a pound, so that the spring 7 may be light. The height of the water in the outer pot is observed by means of the glass 43.

Having thus described my invention what I claim as new and desire to secure by Letters Patent of the United States is as follows:

1. An electrically heated receptacle, comprising a jacketed vessel having a sealed vapor-generating chamber between the inner and outer walls thereof, an electric heater therefor, a circuit controller having its contacts connected to said heater, and a compartment in direct communication with said chamber, said compartment being entirely closed except for said communication and having an expansible member adapted to actuate said controller in response to variations of fluid pressure in said chamber.

2. An electrically heated receptacle, comprising a jacketed vessel having a sealed vapor-generating chamber between the inner and outer walls thereof, an electric heater therefor, a circuit controller having its contacts connected to said heater, a compartment in direct communication with said chamber, said compartment being entirely closed except for said communication and having an expansible member adapted to actuate said controller in response to variations of fluid pressure in said chamber, and adjustable means for varying the normal tension upon said expansible member.

3. An electrically heated receptacle, comprising a jacketed vessel having a sealed vapor-generating chamber between the inner and outer walls thereof, an electric heater therefor, a circuit controller having its contacts connected to said heater, and a safety device connected to said chamber having a valve yieldingly held to its seat and adapted to be raised therefrom upon a predetermined fluid pressure.

In testimony whereof I have hereunto set my hand this 8" day of April A. D. 1912, in the presence of the two subscribed witnesses.

ANSEL C. HULBERT.

Witnesses:
C. P. GRIFFIN,
HENRY B. LESTER.